(12) United States Patent
Xu (10) Patent No.: US 8,213,604 B2
(45) Date of Patent: Jul. 3, 2012

(54) SIGNCRYPTION SCHEME BASED ON ELLIPTIC CURVE CRYPTOGRAPHY

(75) Inventor: Sheng-Bo Xu, Hoofddorp (NL)

(73) Assignee: Irdeto Access B.V. (NL)

( * ) Notice: Subject to any disclaimer, the term of this patent is extended or adjusted under 35 U.S.C. 154(b) by 395 days.

(21) Appl. No.: 12/506,606

(22) Filed: Jul. 21, 2009

(65) Prior Publication Data

US 2010/0034382 A1 Feb. 11, 2010

(30) Foreign Application Priority Data

Aug. 5, 2008 (EP) .................................... 08161784

(51) Int. Cl.
*H04L 9/30* (2006.01)
(52) U.S. Cl. ....................................................... 380/30
(58) Field of Classification Search .............. 380/28–30, 380/47, 37, 44
See application file for complete search history.

(56) References Cited

U.S. PATENT DOCUMENTS

| | | | | |
|---|---|---|---|---|
| 6,246,767 | B1* | 6/2001 | Akins et al. ................... | 380/210 |
| 2004/0205337 | A1* | 10/2004 | Mao et al. ..................... | 713/160 |
| 2005/0135610 | A1* | 6/2005 | Chen et al. ..................... | 380/30 |
| 2006/0159259 | A1* | 7/2006 | Gentry ............................ | 380/42 |
| 2006/0177051 | A1* | 8/2006 | Lauter et al. .................... | 380/28 |

OTHER PUBLICATIONS

"European Patent Appn. Serial No. 08161784.7", *Communication: European Search Report Jun. 8, 2009*, 6 pgs.
An, Jee Hea, et al., "On the Security of Joint Signature and Encryption", *Int'l Conf. on the Theory and Applications of Cryptographic Techniques*, Amsterdam, NL, (Apr. 28, 2002), 83-107.
Davies, D.W., et al., "Chapter 9—Digital Signatures, Security for Computer Networks", *RITY for Computer Networks, Introduction to Data Security in Teleprocessing and Electronic Funds Transfer*, Chichester, Wiley & Sons, (Jan. 1, 1989), 252-281.
Hwang, Ren-Junn, et al., "An efficient signcryption scheme with forward secrecy based on elliptic curve", *Applied Mathematics and Computation, Elsevier*, vol. 167, No. 2, (Aug. 15, 2005), 870-881.
Mu, Yi, et al., "Identity-Based Authentication Broadcast Encryption and Distributed Authenticated Encryption", *Asian 2004, LNCS 3321*, (2004), 169-181.
"European Application Serial No. 08161784.7, Office Action mailed Apr. 11, 2012", 6 pgs.
Han, Y., et al., "Authenticated Public-key Encryption Based on Elliptic Curve", *IEEE Second International Conference on Embedded Software and Systems*, (2005), 424-431.

* cited by examiner

*Primary Examiner* — Nirav B Patel
(74) *Attorney, Agent, or Firm* — Schwegman, Lundberg & Woessner, P.A.

(57) ABSTRACT

Embodiments include a method and a system for signcrypting data based on elliptic curve cryptography. In a head-end system data is encrypted using a random point R and digitally signed using the random point R. Only the x-coordinate $R_x$ of the random point R and only the signature component $s_{signature}$ of the signature are added to the data after signcrypting the data. In a smartcard the signcrypted data is verified using the random point R and decrypted using the random point R.

9 Claims, 5 Drawing Sheets

SIGNCRYPTION SCHEME BASED ON ELLIPTIC CURVE CRYPTOGRAPHY

CLAIM OF PRIORITY

The present patent application claims the priority benefit of the filing date of European Application (EPO) No. 08161784.7, filed Aug. 5, 2008, the entire content of which is incorporated herein by reference in its entirety.

FIELD OF THE INVENTION

The present invention relates to a method for encrypting and digitally signing data based on elliptic curve cryptography, a conditional access system, a head-end system and a smartcard.

BACKGROUND

Conditional access systems are well known and widely used in conjunction with currently available pay television systems. At present, such systems are based on the transmission of services encrypted with control words (also referred to as service encryption keys) that are received by subscribers having a set-top box and a smartcard for each subscription package. Typically these services are transmitted by a head-end system in a broadcast stream. Implementations are known wherein set-top box functionality is integrated into a device like a television, a personal video recorder, a mobile phone, a smart phone or a computer appliance. Smartcard implementations are known wherein the smartcard is a separate card that is manually inserted into the set-top box before operation or a surface mounted device integrated into the set-top box. Software implemented smartcards are known that run as a software module in the set-top box. The smartcard for a subscription package from a particular service provider allows the encrypted services within the package to be decrypted and viewed. The broadcast stream further contains entitlement management messages (EMMs), also referred to as key management messages (KMMs), and entitlement control messages (ECMs), which are necessary for the smartcard to decrypt the service. The control word is the primary security mechanism for protecting the service data and changes relatively frequently. ECMs are used to carry the control word in encrypted form, and are therefore sent relatively frequently. EMMs are used to convey the secret keys used to decrypt the ECMs to extract the control word, to decrypt other data related to the addition or removal of viewing/usage rights, and/or to decrypt other user-specific data. As such there are different kinds of EMMs, which are sent with varying degrees of frequency, but invariably somewhat slower or much slower than the frequency at which ECMs are sent.

Elliptic curve cryptography is a known technique for encrypting and digitally signing messages such as EMMs and ECMs. An elliptic curve cryptosystem implementing an elliptic curve cryptographic technique performs arithmetic operations on an elliptic curve over a finite field determined by predefined elliptic curve domain parameters. The elliptic curve domain parameters are stored in the head-end system for encryption and signing purposes and stored on the smartcard for decryption and signature verification purposes.

Elliptic curve cryptography typically uses one of the following elliptic curve domain parameters: elliptic curve domain parameters over finite field $IF_p$ and elliptic curve domain parameters over $IF_{2^m}$.

The elliptic curve domain parameters over $IF_p$ are p, a, b, G, n and h. Parameter p is a prime specifying the finite field $IF_p$. Parameters $a \in IF_p$ and $b \in IF_p$ specify the elliptic curve $E(IF_p)$ defined by the equation $y^2=x^3+a*x+b$. Parameter G is a base point $(G_x,G_y)$ of a cyclic subgroup of points on the elliptic curve. Parameter n is the order of G, i.e. the smallest non-negative prime number n such that $n \cdot G=O$ (O being a point at infinity). Parameter h is the cofactor $|E(IF_p)|/n$.

The elliptic curve domain parameters over $IF_{2^m}$ are m, f(x), a, b, G, n and h. Parameter m is an integer specifying the finite field $IF_{2^m}$. Parameter f(x) is an irreducible binary polynomial of degree m specifying the representation of $IF_{2^m}$. Parameters $a \in IF_{2^m}$ and $b \in IF_{2^m}$ specify the elliptic curve $E(IF_{2^m})$ defined by the equation $y^2+x*y=x^3+a*x^2+b$ in $IF_{2^m}$. Parameter G is a base point $(G_x,G_y)$ of a cyclic subgroup of points on the elliptic curve. Parameter n is the order of G, i.e. the smallest non-negative prime number n such that $n \cdot G=O$ (O being a point at infinity). Parameter h is the cofactor $|E(IF_{2^m})|/n$.

Encryption is the process of transforming information (also known as plaintext) using an algorithm (also known as a cipher) to make it unreadable to anyone except those possessing a decryption key. A known public-key encryption scheme based on elliptic curve cryptography is the Elliptic Curve Integrated Encryption Scheme (ECIES). ECIES is described in e.g. 'M. Abdalla, M. Bellare, P. Rogaway, "*DHAES: An encryption scheme based on the Diffie-Hellman problem*", http://www-cse.ucsd.edu/users/mihir/papers/dhies.html, 18 Sep. 2001' and is standardized in e.g. ANSI X9.63 and IEEE P1363A, which are incorporated by reference in its entirely in the present application. ECIES uses the receiver's private key (denoted as parameter $d_{receiver}$) and public key (denoted as parameter $Q_{receiver}$) in the encryption/decryption process. Herein, parameter $d_{receiver}$ is typically a randomly selected integer in the interval [1,n−1]. Parameter $Q_{receiver}$ typically equals $d_{receiver} \cdot G$.

To encrypt a plaintext message using ECIES, the head-end system performs the following. Firstly, a random number r is generated and a random point $R=r \cdot G$ is calculated resulting in $R=(R_x,R_y)$. Secondly, a shared secret $S=P_x$ is derived, where $P=(P_x,P_y)=r \cdot Q_{receiver}$ (and P is not a point at infinity). Thirdly, a key derivation function (KDF), such as KDF1 or KDF2 as defined in ISO/IEC 18033-2, is used to derive a symmetric encryption key by calculating $k_E=KDF(S)$. Fourthly, the message is encrypted using the encryption key $k_E$ by calculating $E(k_E;message)$. Fifthly the result of the encryption is output as R||encrypted_message, i.e. random point R concatenated with the encrypted message.

To decrypt the message using ECIES, the smartcard performs the following. Firstly, the shared secret $S=P_x$ is derived, where $P=(P_x,P_y)=d_{receiver} \cdot R$. Secondly, the KDF is used to derive the symmetric encryption key by calculating $k_E=KDF(S)$. Thirdly, the message is decrypted using the encryption key $K_E$ by calculating $E^{-1}(k_E;encrypted\_message)$.

A digital signature is a type of asymmetric cryptography used to simulate the security properties of a handwritten signature on paper. A digital signature provides authentication of a message. A known public-key signature algorithm based on elliptic curve cryptography is the Elliptic Curve Digital Signature Algorithm (ECDSA). ECDSA is standardized in e.g. ANSI X9.62, FIPS 186-2, IEEE P1363 and ISO 15946-2, which are incorporated by reference in its entirely in the present application. ECDSA uses the sender's private key (denoted as parameter $d_{sender}$) and public key (denoted as parameter $Q_{sender}$) in the signing/verification process.

Herein, parameter $d_{sender}$ is typically a randomly selected integer in the interval [1,n−1]. Parameter $Q_{sender}$ typically equals $d_{sender} \cdot G$.

To digitally sign a message using ECDSA, the head-end system performs the following. Firstly, a hash e of the message is calculate as e=H(message), where H is a cryptographic hash function such as SHA-1 as defined in FIPS PUB 180-1. Secondly, a random integer k is selected from [1,n−1]. Thirdly, signature component $r_{signature}=x_1 \pmod{n}$ is calculated, where $(x_1,y_1)=k \cdot G$. If $r_{signature}$ equals 0, the second operation is repeated. Fourthly, signature component $s_{signature}=k^{-1}*(e+r_{signature}*d_{sender})\pmod{n}$ is calculated. If $s_{signature}$ equals 0, the second operation is repeated. Fifthly, the resulting signature is output as $r_{signature} \| s_{signature}$, i.e. signature component $r_{signature}$ concatenated with signature component $s_{signature}$.

To verify the digital signature of the message using ECDSA, the smartcard performs the following. Firstly, it is verified that signature component $r_{signature}$ and signature component $s_{signature}$ are integers in [1,n−1]. If not, the signature is invalid. Secondly, the hash e of the message is calculated as e=H(message), where H is the same function used in the signature generation. Thirdly, $w=s_{signature}^{-1} \pmod{n}$ is calculated. Fourthly, $u_1=e*w \pmod{n}$ and $u_2=r_{signature}*w \pmod{n}$ are calculated. Fifthly, $(x_1,y_1)=u_1 \cdot G+u_2 \cdot Q_{sender}$ is calculated. Sixthly it is concluded that the signature is valid if $x_1=r_{signature} \pmod{n}$ or invalid otherwise.

The process of both encrypting and digitally signing data is also known as signcryption.

Figure 1A:
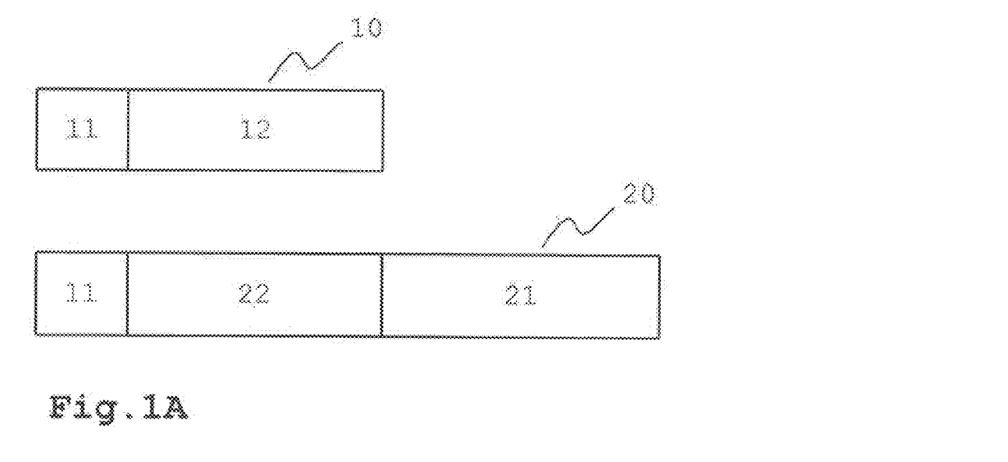
FIG. 1A shows a prior art example of an ECM or EMM prior to and after applying ECIES.

In FIG. 1A a prior art example of an EMM or ECM before and after applying ECIES encryption is shown. The unencrypted ECM/EMM 10 in this example has a 6-byte header 11 and a 50-byte payload 12. The payload 12 is encrypted using ECIES and a 192-byte public key. This is also known as encrypting using ECC-192. The resulting encrypted EMM/ECM 20 contains the header 11, a 48-byte random point $R=(R_x,R_y)$ 21 and a 50-byte encrypted payload 22. Thus, the encrypted EMM/ECM packet 20 in this example is 48 bytes longer after encryption due to a 48-byte overhead of random point R 21. It is possible to use a public key of a different size, resulting in a random point $R=(R_x,R_y)$ of a different size.

Figure 1B:
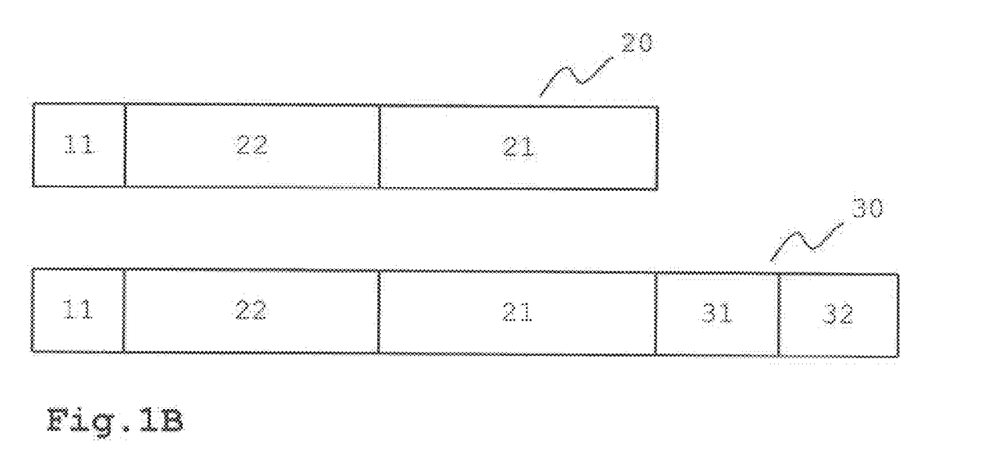
FIG. 1B shows a prior art example of an ECM or EMM prior to and after applying ECDSA.

In FIG. 1B a prior art example of an encrypted EMM or ECM before and after applying ECDSA digitally signing is shown. The encrypted EMM/ECM 20 in this example has a 6-byte header 11, a 48-byte random point $R(R_x,R_y)$ 21 and a 50-byte encrypted payload 22. The encrypted EMM/ECM is digitally signed using ECDSA and a 192-byte public key. This is also known as digitally signing using ECC-192. The resulting signed and encrypted EMM/ECM 30 contains the encrypted ECM 20, a 24-byte signature component $r_{signature}$ 31 and a 24-byte signature component $s_{signature}$ 32. Thus, the digitally signed and encrypted ECM packet 30 in this example is 48 bytes longer after digitally signing due to a 24-byte overhead of signature components $r_{signature}$ 31 and a 24-byte overhead of signature component $s_{signature}$ 32. It is possible to use a public key of a different size, resulting in signature components of a different size.

ECIES and ECDSA increase the size of messages. In the example of ECC-192 a total of 96 bytes are added to the message after applying ECIES and ECDSA. For EMMs and ECMs with a typical data packet size of 184 bytes, this overhead is significant.

In EP0874307A1 a method is disclosed for multiplication of a point P on elliptic curve E by a value k in order to derive a point kP. The method is disclosed for elliptic curves in a binary field $IF_{2^m}$ only. The method comprises representing the number k as vector of binary digits stored in a register and forming a sequence of point pairs (P1, P2) wherein the point pairs differed most by P and wherein the successive series of point pairs are selected either by computing (2mP,(2m+1)P) from (mP,(m+1)P) or ((2m+1)P,(2m+2)P) from (mP,(m+1)P). The computations may be performed without using the y-coordinate of the points during the computation while allowing the y-coordinate to be extracted at the end of the computations, thus, avoiding the use of inversion operations during the computation and therefore, speeding up the cryptographic processor functions. EP0874307A1 also discloses a method for accelerating signature verification between two parties. In EP0874307A1 signcrypted messages disadvantageously have an increased size due to overhead added to the messages by encrypting and digitally signing the messages.

SUMMARY OF THE INVENTION

Embodiments of the invention provide an improved method for encrypting and digitally signing data based on elliptic curve cryptography.

According to various embodiments, a method is proposed for processing data based on elliptic curve cryptography to obtain a processing result. The method comprises encrypting the data using a random point R to obtain encrypted data. The method further comprises digitally signing the encrypted data using the random point R to obtain the processing result.

Thus, embodiments of the method comprising encrypting and digitally signing data based on elliptic curve cryptography advantageously enables generation of a digital signature that reuses random data calculated in the encryption operation, enabling a reduced data overhead after signcryption.

The embodiment of claim 2 advantageously enables a processing result without a y-coordinate $R_y$ of the random point R and without a signature component $r_{signature}$.

The embodiment of claim 3 advantageously enables signcryption of entitlement management messages or entitlement control messages.

According to various embodiments, a method is proposed for processing data based on elliptic curve cryptography to obtain a processing result. The method comprises verifying the data using a random point R. The method further comprises decrypting the data using the random point R to obtain the processing result.

Thus, the method included in various embodiments comprising verifying and decrypting the data, which is signcrypted data, based on elliptic curve cryptography advantageously enables digital signature verification and decryption of the data, wherein the same random point R is used in both operations, enabling a reduced data overhead in the signcrypted data.

The embodiment of claim 6 advantageously enables signature verification and decryption of data without a y-coordinate $R_y$ of the random point R and without a signature component $r_{signature}$.

The embodiment of claim 7 advantageously enables signature verification and decryption of signcrypted entitlement management messages or signcrypted entitlement control messages.

The embodiments of claims 4 and 8 advantageously enable one or more embodiments of the method to be used in a conditional access system.

According to various embodiments, a conditional access system is proposed comprising a head-end system and one or more smartcards. The conditional access system is arranged to perform one or more of the above mentioned methods.

Thus, the conditional access system advantageously enables signcryption of data with a reduced data overhead after signcryption.

According to various embodiments, a head-end system is proposed. The head-end system is arranged to perform one or more of the above mentioned methods. Thus the head-end system advantageously enables signcryption with a reduced data overhead after signcryption.

According to various embodiments, a smartcard is proposed. The smartcard is arranged to perform one or more operations included in the above mentioned methods. Thus, the smartcard of the embodiments of the invention advantageously enables signature verification and decryption of signcrypted data having a reduced data overhead.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to one or more of the embodiments shown in the drawings, in which.

DETAILED DESCRIPTION OF THE DRAWINGS

FIGS. 1A and 1B show a prior art example of an ECM or EMM prior to and after applying ECIES (FIG. 1A) and ECDSA (FIG. 1B) and have been discussed in the background section.

Embodiments of the invention are typically applied in a conditional access system wherein EMMs and ECMs are transmitted in signcrypted form. Embodiments of the invention are not limited to application in conditional access systems, and can be used in any system where data is signcrypted.

Figure 2:
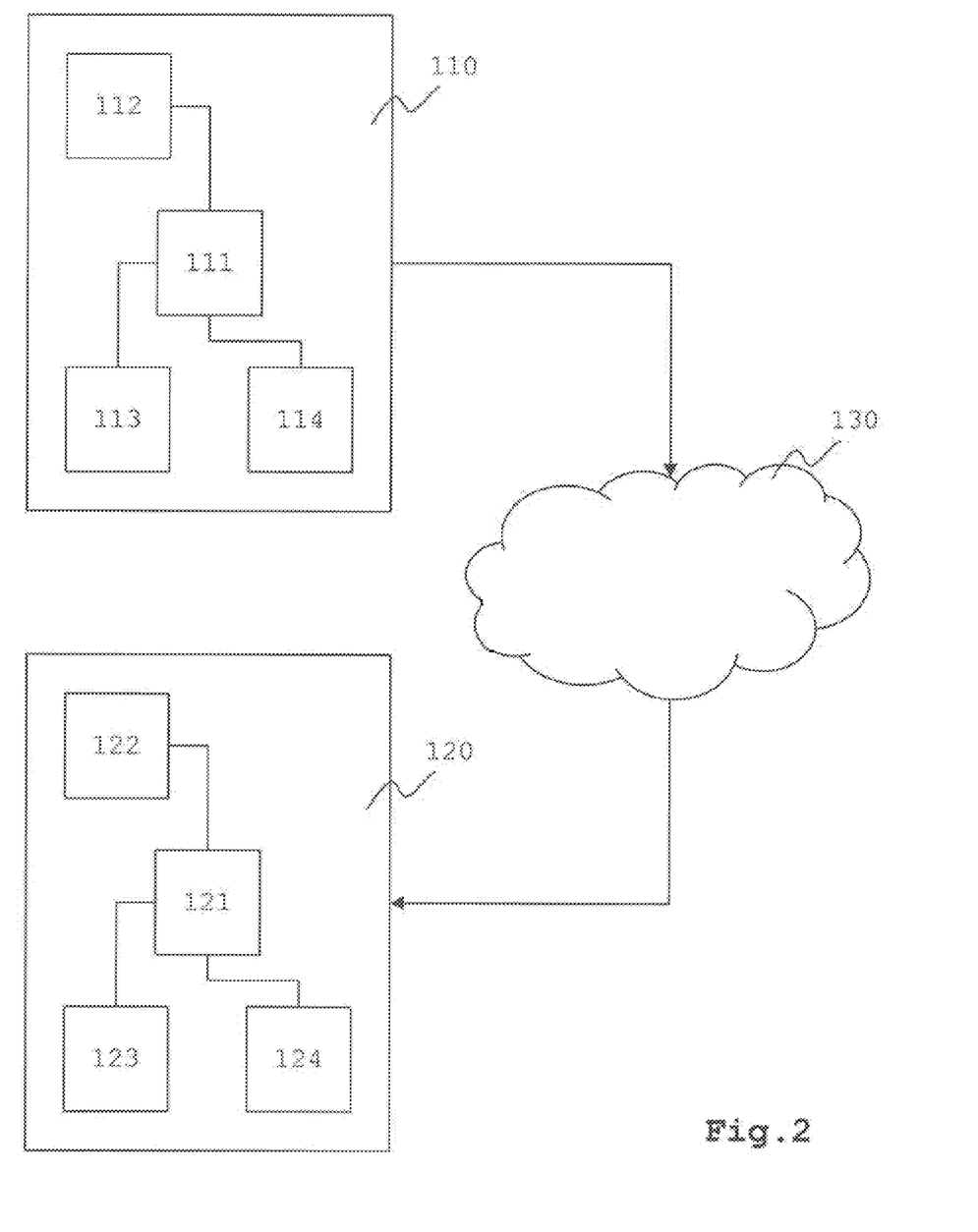
FIG. 2 shows a schematic illustration of a conditional access system according to one or more embodiments of the invention.

In FIG. 2 a typical conditional access system 100 is shown. FIG. 2 only shows the main elements involved in signcryption, other elements not shown can be part of the conditional access system 100. In the conditional access system 100 a head-end system 110 transmits signcrypted EMMs and signcrypted ECMs to a smartcard 120 through a broadcast network 130. The smartcard 120 is e.g. located in a set-top box (not shown) for receiving the signcrypted EMMs/ECMs and forwarding the signcrypted EMMs/ECMs to the smartcard 120. Although FIG. 2 only shows one smartcard 120, in various embodiments there is more than one smartcard in a conditional access system. In case of multiple smartcards, the head-end system 110 is capable of transmitting EMMs/ECMs to each of the smartcards.

Figure 5:
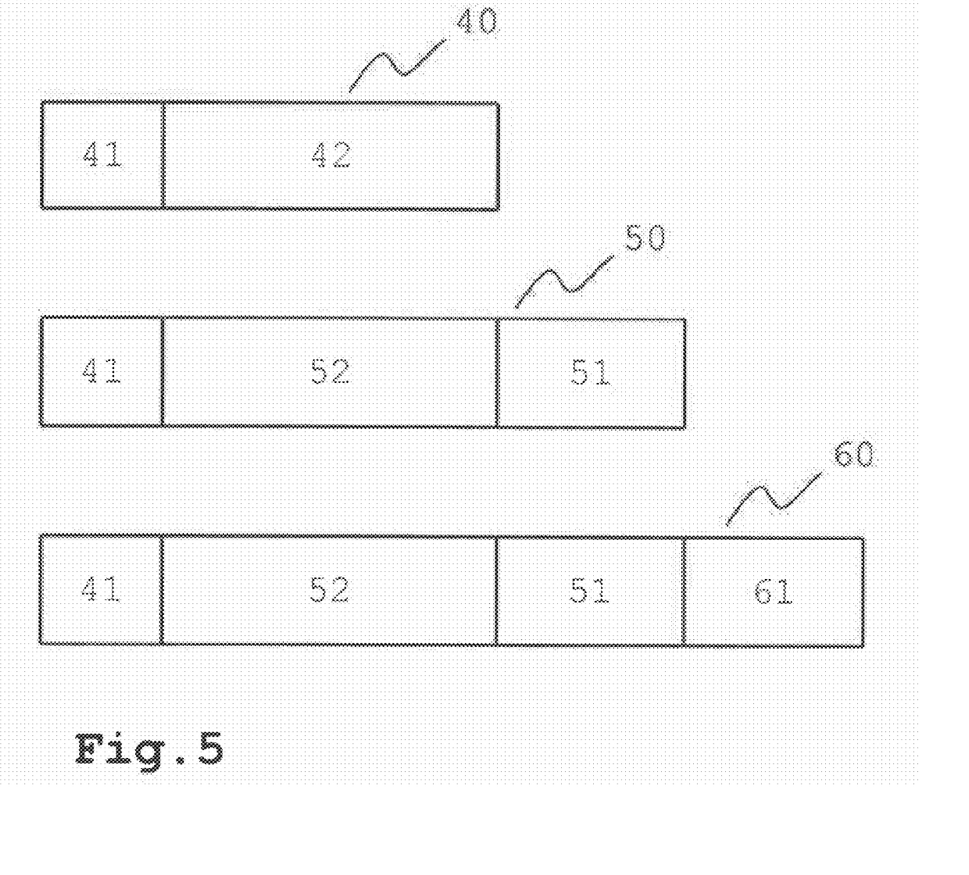
FIG. 5 shows an ECM or EMM prior to and after applying ECIES and ECDSA according to one or more embodiments of the invention.

The head-end system 110 comprises a processor 111, a memory 112, an encryption module 113 and a digital signature module 114. Using the processor 111 the encryption module 113 reads a plaintext EMM from the memory 112. With reference to FIG. 5, the plaintext EMM 40 contains a header portion 41 and a payload portion 42. Alternatively, in various embodiments, the encryption module 113 can read a plaintext ECM from the memory 112. Using the processor 111 the payload portion 42 of the plaintext EMM 40 is encrypted using a modified ECIES scheme as described below. The resulting encrypted EMM 50 contains the header portion 41, the encrypted payload portion 52 and the x-coordinate $R_x$ 51 of the random point R. Next, the encrypted EMM 50 is passed to the digital signature module 114. The memory 112 can be used to temporary store the encrypted EMM 50. Next, using the processor 111 the encrypted EMM 50 is digitally signed in the digital signature module 114 using a modified ECDSA algorithm as described below. The resulting signcrypted EMM 60 contains the header portion 41, the encrypted payload 52, only the x-coordinate $R_x$ 51 of the random point R and only the signature component $s_{signature}$ 61 of the signature. The signcrypted EMM 60 is transmitted to the smartcard 120 through the broadcast network 130.

The smartcard 120 comprises a processor 121, a memory 122, a signature verification module 123 and a decryption module 124. Through the set-top box (not shown) the smartcard receives the signcrypted EMM 60 and stored it in the memory 122. Using the processor 121 the signcrypted EMM 60 is read from the memory 122 and verified in the signature verification module 123 using a modified ECDSA algorithm as described below. If the signcrypted EMM 60 is verified as authentic, then the encrypted payload portion 52 of the signcrypted EMM 60 is decrypted in the decryption module 124 using a modified ECIES scheme as described below. As a result, the payload portion 42 of the plaintext EMM is obtained.

Figure 3:
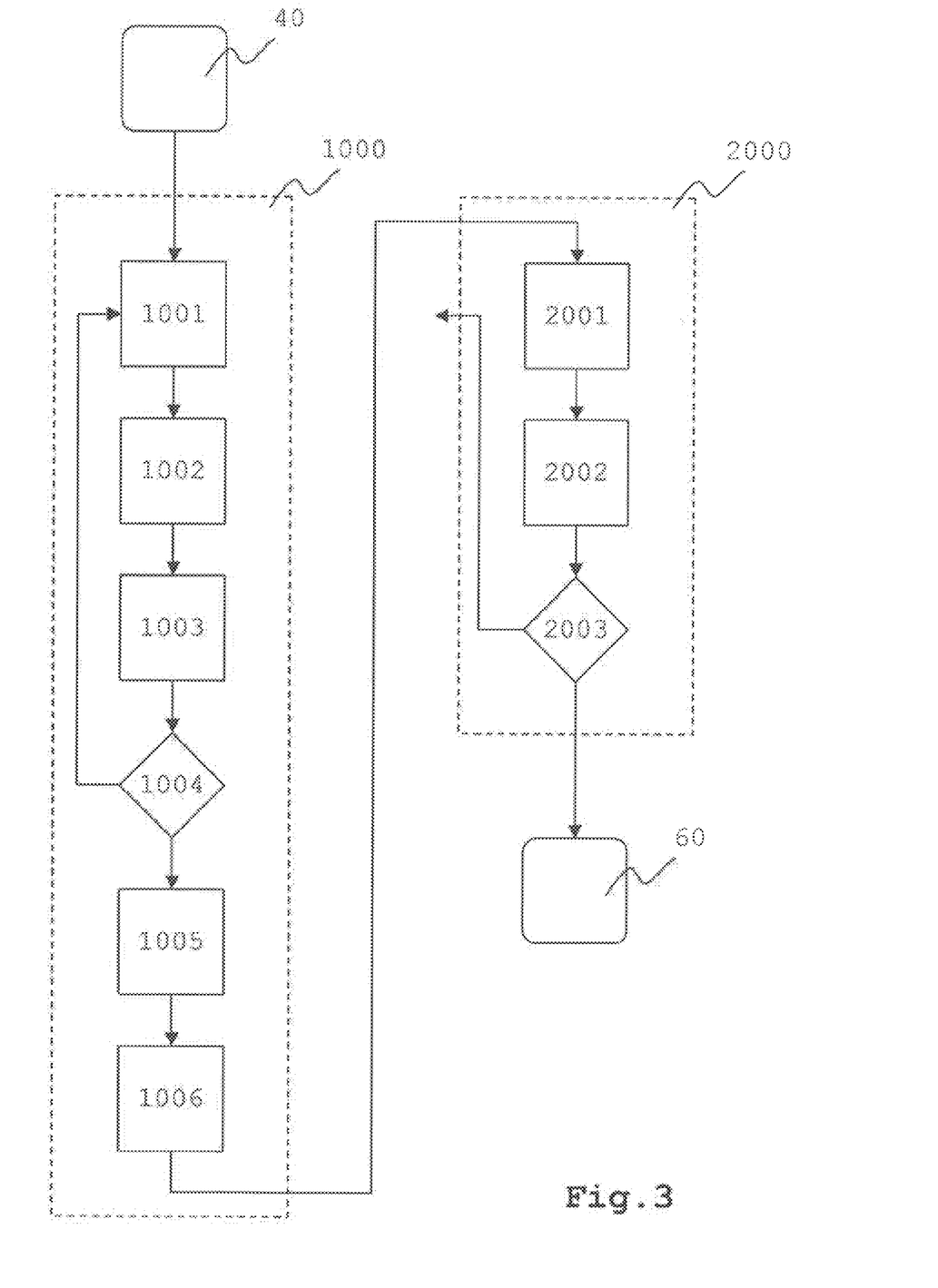
FIG. 3 shows a method comprising encrypting and digitally signing data according to one or more embodiments of the invention.

With reference to FIG. 3, encrypting 1000 and digitally signing 2000 data according to various embodiments of the invention uses a modified ECIES scheme and a modified ECDSA scheme. To signcrypt an EMM, the head-end system 110 uses the following information as input:

a plaintext EMM 40—as e.g. shown in FIG. 5—containing a header portion 41 and a payload portion 42;
  elliptic curve domain parameters p, a, b, G, n and h, wherein h has a small value, preferably below 5 and in the following example a value of 1;
  a public key $Q_{receiver}$ of the receiving smartcard 120, which is a random point with both x and y coordinates on the elliptic curve defined by the domain parameters; and
  a private key $d_{sender}$ of the transmitting head-end system 110, which is an integer.

In the encrypting part 1000 of signcrypting the EMM a random number r is generated in 1001 and random point $R=r \cdot G=(R_x, R_y)$ is calculated in 1002. Next, a shared secret $S=P_x$ is derived in 1003, where $P=(P_x, P_y)=r \cdot Q_{receiver}$. In 1004, it is checked is P is a point at infinity. If this is the case, then 1001 is repeated. Otherwise, in various embodiments a symmetric encryption key $k_E=KDF(S)$ is derived in 1005. In 1006, the payload portion 42 of the EMM 40 is encrypted using the encryption key $k_E$. The resulting encrypted EMM 50 contains the header portion 41, the x-coordinate $R_x$ 51 of the random point R and the encrypted payload 52.

In the digital signing part 2000 of signcrypting the EMM a hash function, e.g. SHA-1, is used to calculate 2001 a hash value e of the encrypted EMM 50, i.e. e=H(encrypted EMM 50) is calculated. In 2002 signature component $S_{signature}$ is calculated using the same random number r and the x-coordinate $R_x$ as used in the encrypting part 1000 of signcrypting the EMM, i.e. $S_{signature}$ is calculated 2002 as $S_{signature}=r^{-1}*(e+R_x*d_{sender})$. In 2003 it is checked if s equals zero. If this is the case, then 1 is repeated. The resulting signcrypted EMM 60 contains the header portion 41, the x-coordinate $R_x$ 51 of the random point R, the encrypted payload 52 and signature component $S_{signature}$ 61.

Figure 4:
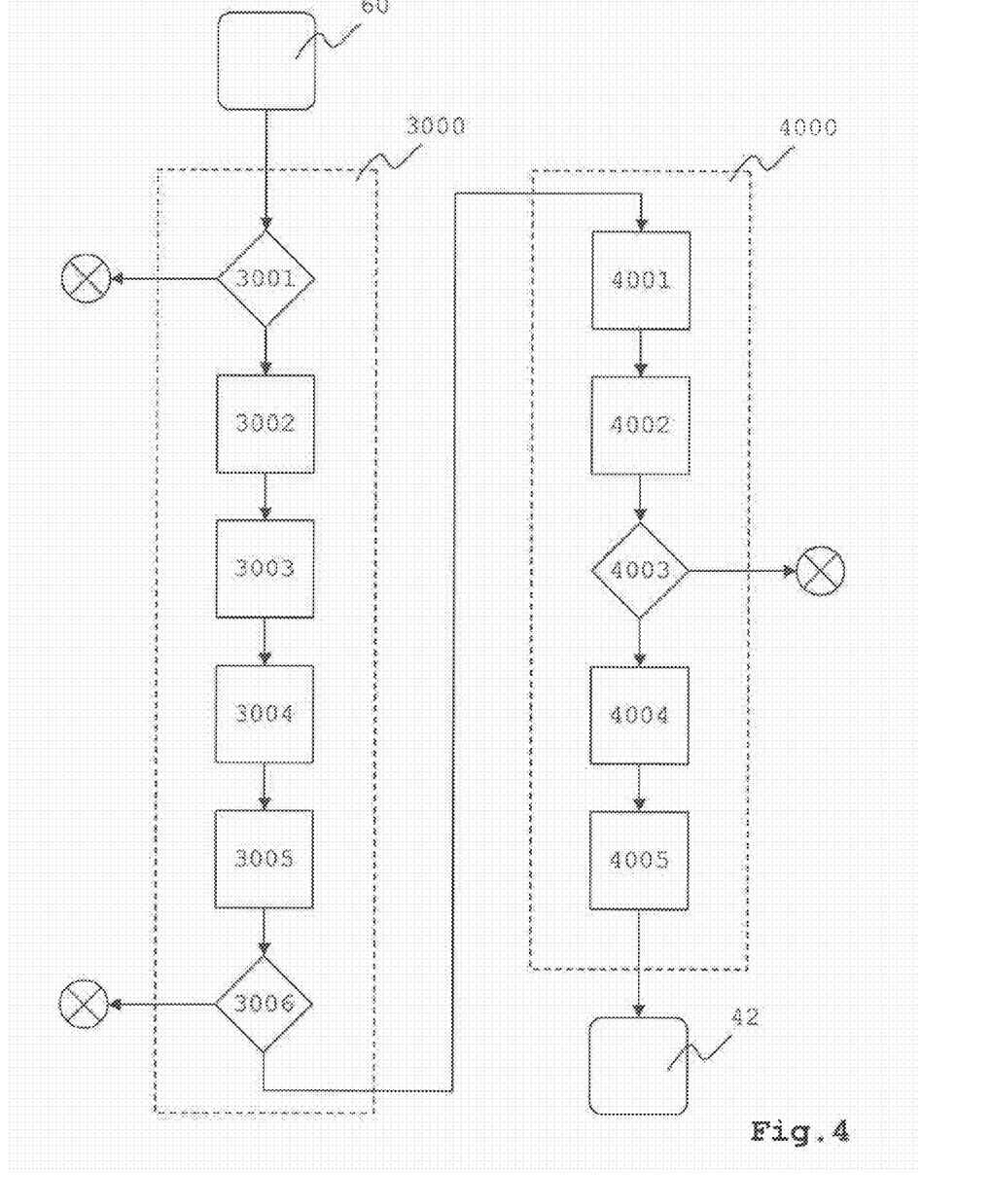
FIG. 4 shows a method comprising verifying and decrypting data according to one or more embodiments of the invention.

With reference to FIG. 4, verifying 3000 and decrypting 4000 data according to various embodiments of the invention uses a modified ECIES scheme and a modified ECDSA scheme. To verify and decrypt an EMM, the smartcard 120 uses the following information as input:

- a signcrypted EMM 60—as e.g. shown in FIG. 5—containing a header portion 41, an x-coordinate $R_x$ 51 of a random point R, an encrypted payload portion 52 and a signature component $S_{signature}$ 61;
- the same elliptic curve domain parameters p, a, b, G, n and h as used for signcrypting the EMM;
- a public key $Q_{sender}$ of the transmitting head-end system 110, which is a random point with both x and y coordinates on the elliptic curve defined by the domain parameters; and
- a private key $d_{receiver}$ of the receiving smartcard 120, which is an integer.

In the verification part 3000 it is verified in 3001 if the received x-coordinate $R_x$ 51 of the random point R and the signature component $S_{signature}$ 61 are integers in the range [1,n−1]. If this is not the case, then the signcrypted EMM 60 is not authentic, i.e. it is different from the signcrypted EMM as created by the head-end system 110. The non-authentic EMM is discarded and not further processed. Otherwise, in 3002 the hash value e=H(encrypted EMM 50) is calculated for the encrypted EMM 50, i.e. the signcrypted EMM 60 without signature component $s_{signature}$ 61. Herein H is the same function as used in the signature generation, e.g. the same SHA-1 function. In 3003, $w=s_{signature}^{-1}(mod\ n)$ is calculated. In 3004 $u_1=e*w(mod\ n)$ and $u_2=R_x*w(mod\ n)$ are calculated. In 3005 $(x_1,y_1)=u_1 \cdot G+u_2 \cdot Q_{sender}$ is calculated. In 3006 it is verified if $x_1=R_x(mod\ n)$. If this is not the case, then the signcrypted EMM 60 is not authentic, i.e. it is different from the signcrypted EMM as created by the head-end system 110. The non-authentic EMM is discarded and not further processed. Otherwise, the signcrypted EMM 60 is authentic and can be decrypted.

In the decryption part 4000 a y-coordinate $R_y$ of the random point R is calculated from $R_x$ and a point $R'=(R'_x,R'_y)$ is constructed in 4001. $R'_y$ can either be equal to $R_y$ or to $-R_y$. In 4002 $P'=(P_x,P'_y)=d_{receiver} \cdot R'$ is calculated. In 4003, it is verified if P is a point at infinity. If this is the case, then the signcrypted EMM is discarded and not further processed. Otherwise, the symmetric encryption key $K_E$ is derived 4004 by calculating $K_E=KDF(P_x)$. With the derived $K_E$ the encrypted payload portion 52 of the signcrypted EMM 60 is decrypted in 4005 and the plaintext payload 42 is obtained.

Embodiments of the invention are not limited to the given examples. The encrypting part 1000, digital signing part 2000, verification part 3000 and decrypting part 4000 as shown in FIGS. 3 and 4 can e.g. use different calculation operations to arrive at the same result with the same input.

What is claimed is:

1. A method for processing data based on elliptic curve cryptography to obtain a processing result, comprising:
    encrypting the data using a random point R to obtain encrypted data; and
    digitally signing the encrypted data using the random point R to obtain the processing result;
    wherein encrypting the data uses an elliptic curve integrated encryption scheme, wherein a random number r is used for calculating the random point R, and wherein an x-coordinate $R_x$ of the random point R and the encrypted data form an encryption result,
    and wherein signing the encrypted data uses are elliptic curve digital signature algorithm, wherein a hash of the encryption result is calculated and wherein the random number r and the x-coordinate $R_x$ of the random point R are used for calculating a signature component $s_{signature}$ of a signature,
    and further including outputting the processing result comprising the encrypted data, only the x-coordinate $R_x$ of the random point R and only the signature component $s_{signature}$ of the signature.

2. The method according to claim 1,
    wherein encrypting the data includes encrypting a payload portion of an entitlement management message or an entitlement control message to obtain an encrypted payload portion,
    and wherein digitally signing the encrypted data includes digitally signing the encrypted payload portion and a header portion of the entitlement management message or the entitlement control message to obtain a signcrypted entitlement management message or a signcrypted entitlement control message.

3. The method according to claim 2, wherein the method is performed in a head-end system of a conditional access system and the method further comprises:
    transmitting the signcrypted entitlement management message or the signcrypted entitlement control message from the head-end system to a smartcard.

4. A method for processing data based on elliptic curve cryptography to obtain a processing result, comprising:
    verifying, using one or more processors, the data using a random point R; and
    decrypting, using one or more processors, the data using the random point R to obtain the processing result;
    wherein the data comprises encrypted data, only an x-coordinate $R_x$ of the random point R and only a signature component $s_{signature}$ of a signature;
    wherein verifying the data uses an elliptic curve digital signature algorithm, wherein the x-coordinate $R_x$ of the random point R is used as a signature component $r_{signature}$ of the signature and signature components $r_{signature}$ and $s_{signature}$ are used to calculate a validity of the signature;
    and wherein decrypting the data uses an elliptic curve integrated encryption scheme, wherein the x-coordinate $R_x$ of the random point R is used for calculating an y-coordinate $R_y$ of the random point R.

5. The method according to claim 4,
    wherein verifying the data includes verifying an encrypted payload portion and a header portion of a signcrypted entitlement management message or a signcrypted entitlement control message;
    and wherein decrypting the data includes decrypting the payload portion of the signcrypted entitlement management message or the signcrypted entitlement control message to obtain a decrypted entitlement management message or a decrypted entitlement control message.

6. The method according to claim 5, wherein the method is performed in a smartcard of a conditional access system and the method further comprises:
    receiving the signcrypted entitlement management message or the signcrypted entitlement control message from a head-end system.

7. A conditional access system comprising:
ahead-end system comprising one or more processors; and one or more smartcards;
wherein the head-end system is operable, using the one or more processors, to process data based on elliptic curve cryptography to obtain a processing result, including encrypting the data using a random point R to obtain encrypted data and digitally signing the encrypted data using the random point R to obtain the processing result;
and wherein encrypting the data includes encrypting a payload portion of an entitlement management message or an entitlement control message to obtain an encrypted payload portion,
and wherein digitally signing the encrypted data includes digitally signing the encrypted payload portion and a header portion of the entitlement management message or the entitlement control message to obtain a signcrypted entitlement management message or a signcrypted entitlement control message;
and wherein the head end system is further operable to transmit the signcrypted entitlement management message or the signcrypted entitlement control message from the heath end system to the one or more smartcards;
and wherein the one or more smartcards is operable to receive the signcrypted entitlement management message or the signcrypted entitlement control message from the head-end system;
and wherein encrypting the data uses an elliptic curve integrated encryption scheme, wherein a random number r is used for calculating the random point R, and wherein an x-coordinate $R_x$ of the random point R and the encrypted data form an encryption result,
and wherein digitally signing the encrypted data uses an elliptic curve digital signature algorithm, wherein a hash of the encryption result is calculated and wherein the random number r and the x-coordinate $R_x$ of the random point R are used for calculating a signature component $s_{signature}$ of a signature,
and further including outputting the processing result comprising the encrypted data, only the x-coordinate $R_x$ of the random point R and only the signature component $s_{signature}$ of the signature.

8. A system comprising:
head-end system comprising one or more processors operable to process data based on elliptic curve cryptography to obtain a processing result, wherein processing the data includes,
encryption, using the one or more processors, of the data using a random point R to obtain encrypted data; and
digital signing, using the one or more processors, of the encrypted data using the random point R to obtain the processing result;
wherein encrypting the data uses an elliptic curve integrated encryption scheme, wherein a random number r is used for calculating the random point R, and wherein an x-coordinate $R_x$ of the random point R and the encrypted data form an encryption result,
and wherein digitally signing the encrypted data uses an elliptic curve digital signature algorithm, wherein a hash of the encryption result is calculated and wherein the random number r and the x-coordinate $R_x$ of the random point R are used for calculating a signature component $s_{signature}$ of a signature,
and further including outputting the processing result comprising the encrypted data, only the x-coordinate $R_x$ of the random point R and only the signature component $s_{signature}$ of the signature.

9. An apparatus comprising:
a smartcard comprising one or more processors operable to process data based on elliptic curve cryptography to obtain a processing result, the processing of the data including,
verification, using the one or more processors, of the data using a random point R; and
decryption, using the one or more processors, of the data using the random point R to obtain the processing result;
wherein encrypting the data uses an elliptic curve integrated encryption scheme, wherein a random number r is used for calculating the random point R, and wherein an x-coordinate $R_x$ of the random point R and the encrypted data form an encryption result,
and wherein digitally signing the encrypted data uses an elliptic curve digital signature algorithm, wherein a hash of the encryption result is calculated and wherein the random number r and the x-coordinate $R_x$ of the random point R are used for calculating a signature component $s_{signature}$ of a signature,
and further including outputting the processing result comprising the encrypted data, only the x-coordinate $R_x$ of the random point R and only the signature component $s_{signature}$ of the signature.

* * * * *